United States Patent [19]

Stauffer

[11] 4,367,027
[45] Jan. 4, 1983

[54] ACTIVE AUTO FOCUS SYSTEM IMPROVEMENT

[75] Inventor: Norman L. Stauffer, Englewood, Colo.

[73] Assignee: Honeywell Inc., Minneapolis, Minn.

[21] Appl. No.: 305,878

[22] Filed: Sep. 28, 1981

Related U.S. Application Data

[62] Division of Ser. No. 129,529, Mar. 12, 1980, Pat. No. 4,317,991.

[51] Int. Cl.³ .............................................. G03B 3/10
[52] U.S. Cl. ........................................ 354/195; 354/25; 250/201
[58] Field of Search ............... 354/25 R, 25 A, 25 N, 354/31 F, 195; 250/201

[56] References Cited

U.S. PATENT DOCUMENTS

| | | |
|---|---|---|
| Re. 27,461 | 8/1972 | Harvey .................... 354/25 A |
| 1,866,581 | 7/1932 | Simjian . |
| 3,435,744 | 4/1969 | Stimson . |
| 3,442,193 | 5/1969 | Pagel . |
| 3,443,502 | 5/1969 | Harvey . |
| 3,599,552 | 8/1971 | Harvey . |
| 3,617,128 | 11/1971 | Harvey . |
| 3,617,761 | 11/1971 | Cooper, Jr. . |
| 3,720,148 | 5/1970 | Harvey . |
| 3,720,468 | 3/1973 | Skagerlund . |
| 3,723,003 | 3/1973 | Vockenhuber et al. . |
| 3,736,057 | 4/1973 | Harvey . |
| 3,751,154 | 8/1973 | Frazee et al. . |
| 3,758,209 | 9/1973 | Harvey . |
| 3,759,614 | 9/1973 | Harvey . |
| 3,759,615 | 9/1973 | Loewe . |
| 3,813,679 | 5/1974 | Hasegawa et al. . |
| 3,820,129 | 6/1974 | Hosoe et al. . |
| 3,906,389 | 9/1975 | Matsumoto et al. . |
| 4,005,442 | 1/1977 | Gallagher . |
| 4,065,778 | 12/1977 | Harvey . |
| 4,067,030 | 1/1978 | Kuramoto et al. . |
| 4,150,888 | 4/1979 | Filipovich . |
| 4,178,087 | 12/1979 | Shenk et al. . |
| 4,182,555 | 1/1980 | Imura et al. ................ 354/25 R |
| 4,183,643 | 1/1980 | Imura et al. ................ 354/25 R |
| 4,317,991 | 3/1982 | Stauffer ................... 354/25 R |

Primary Examiner—Russell E. Adams
Attorney, Agent, or Firm—Charles J. Ungemach

[57] ABSTRACT

An active auto focus system in which a beam of modulated energy is projected towards a subject to be focussed upon with the energy reflected therefrom directed towards a detector array. The detector array comprises a number of radiation responsive elements arranged in parallel rows and in a pattern which permits the reflected energy to impinge upon at least one detector in each of the rows simultaneously. The arrangement allows a digital type output indicative of the position of the reflected energy on the array and thus the position of the subject from the camera.

3 Claims, 5 Drawing Figures

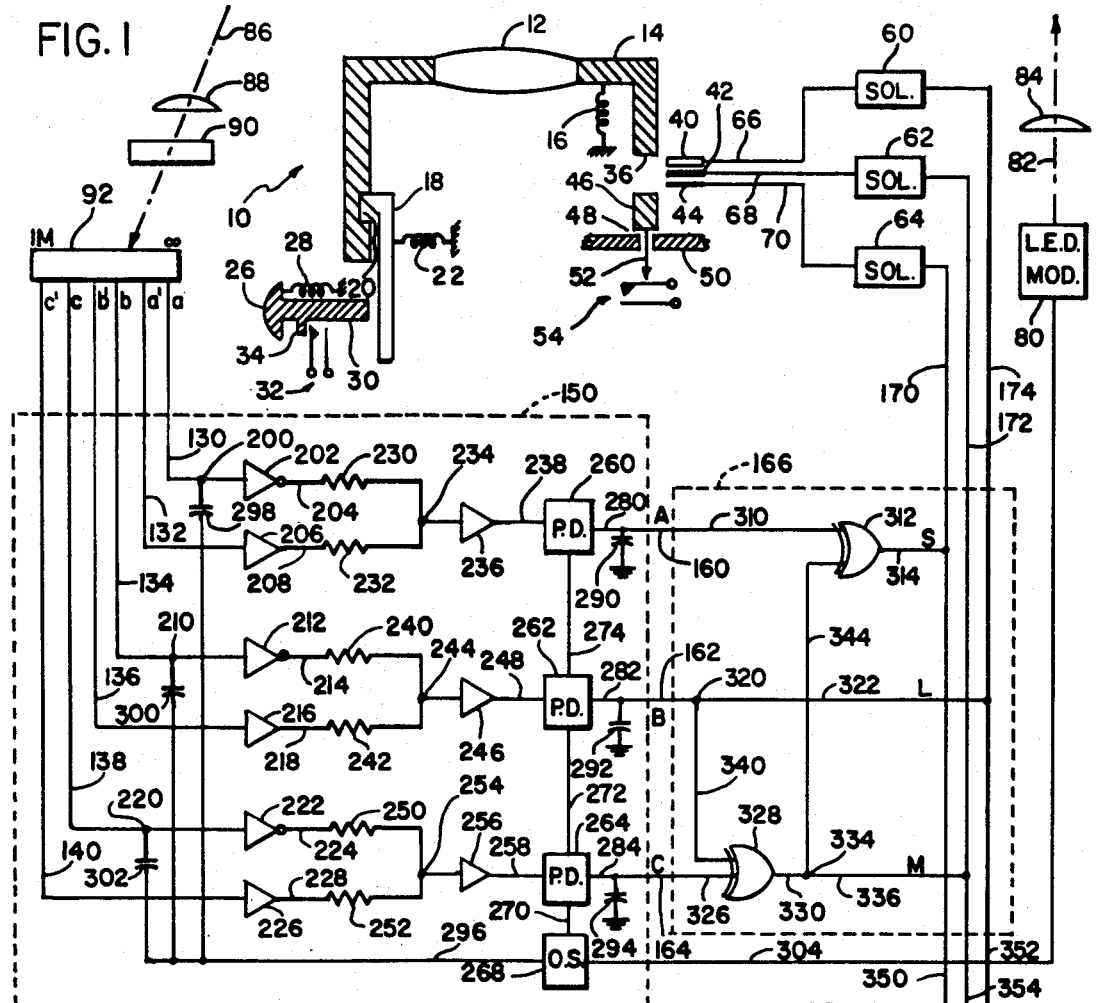
FIG. 1
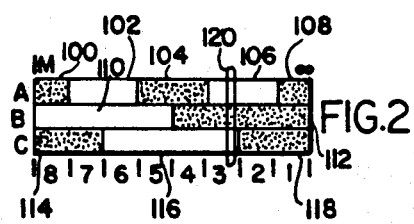
FIG. 2
FIG. 4
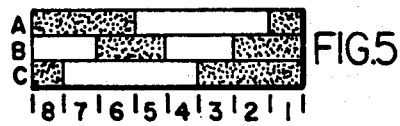
FIG. 5
FIG. 3
| ZONE | | 1 | 2 | 3 | 4 | 5 | 6 | 7 | 8 |
|---|---|---|---|---|---|---|---|---|---|
| DISTANCE (M) | FAR | ∞ | 8.0 | 4.0 | 2.66 | 2.0 | 1.6 | 1.33 | 1.14 |
| | NEAR | 8.0 | 4.0 | 2.66 | 2.0 | 1.6 | 1.33 | 1.14 | 1.0 |
| OUTPUT | A | 0 | 1 | 1 | 0 | 0 | 1 | 1 | 0 |
| | B | 0 | 0 | 1 | 1 | 0 | 0 | 1 | 1 |
| | C | 0 | 0 | 0 | 0 | 1 | 1 | 1 | 0 |
| CONVERTED | S | 0 | 1 | 0 | 0 | 0 | 1 | 0 | 1 |
| | L | 0 | 0 | 1 | 0 | 1 | 0 | 0 | 1 |
| | M | 0 | 0 | 0 | 1 | 0 | 0 | 1 | 1 |
| LENS EXTENSION (mm) | | .04 | .12 | .20 | .28 | .36 | .44 | .52 | .60 |
| SUBJECT FOCUS (M) | | 15.6 | 5.23 | 3.14 | 2.25 | 1.76 | 1.44 | 1.23 | 1.06 |

ACTIVE AUTO FOCUS SYSTEM IMPROVEMENT

This is a division of application Ser. No. 129,529, filed Mar. 12, 1980 now U.S. Pat. No. 4,317,991 issued Mar. 2, 1982.

BACKGROUND OF THE INVENTION

In recent years a number of auto focus systems particularly for use with cameras have been devised. The majority of such auto focus systems fall into one of two main types: first the passive type systems wherein two images of a scene being viewed are compared with the amount of displacement from a coincidence or superimposed position being indicative of the range to the subject and second, the active type systems wherein a projection of either sound or light is directed from the camera to the subject and the reflected energy received back is analyzed to determine the distance to the subject. The present invention relates to an active type system which, in the past, have encountered several difficulties.

Active units, using sound as the projection beam, suffer the problems of reflections off of objects which are not the main subject of the picture and the inability to focus through a transparent medium such as a window. Active systems using light or infrared energy heretofore have usually required moveable projections and/or moveable detectors or have needed multiple projectors to establish a focus position. In some systems, a fixed projector and fixed detectors have been employed but these systems require specially shaped or masked detectors and/or use rather complex electronics to determine the position of the reflected light. Furthermore, prior art systems have produced primarily analog output signals which are difficult to process and use for positioning a camera lens. While steps have been taken to overcome most of the problems encountered with prior art systems and accurate in-focus pictures may be obtained in a majority of the cases with either type system, a truly simple system having a digital output, having no moving parts other than the camera taking lens, having simple electronics, and having a low manufacturing cost has yet to be devised.

SUMMARY OF THE INVENTION

The present invention is an active system utilizing modulated light or infrared energy and employing a unique detector which works in combination with a lens that, in the preferred embodiment, produces a distorted image of the reflected energy to provide a digital output signal indicative of the range to the subject in one of a plurality of zones. In the present invention, a unique and low cost taking lens positioning apparatus is utilized which operates from the digital output without the use of servo motors or other high energy consuming and costly components. More particularly, in the present invention, a modulated source of infrared energy is directed from the camera to the subject and the modulated reflected energy received from the subject is passed through a cylindrical lens or other type of distorting lens so as to create an image of the reflected energy which is a narrow strip or line. This line of reflected energy falls upon a novel detector array which is built to have a plurality of separate detector elements in a predetermined pattern thereon. The position of the reflected line of energy on the detector is indicative of the distance to the subject and through the unique placement of the detector elements on the detector array this position is ascertained in a digital fashion with sufficient accuracy to provide a proper in-focus signal for subjects ranging from very near to infinity. A spring biased taking lens is positioned by a plurality of solenoid actuated shims which stop the lens motion at the proper focus zone.

BRIEF DESCRIPTION OF THE DRAWINGS

FIG. 1 shows a cross sectional and partly schematic diagram of the camera and auto focus circuitry of the present invention;

FIG. 2 shows one embodiment of the detector array with the placement of individual detectors thereon;

FIG. 3 is a table showing the zones, the distances involved in each zone, the system outputs at the various zone positions, the lens extension used for each zone and the nominal position of an in-focus subject in each zone;

FIG. 4 shows an embodiment of the detector array for a four zone system; and

FIG. 5 shows an alternate embodiment of an eight zone system detector array.

DETAILED DESCRIPTION OF THE PREFERRED EMBODIMENT

In FIG. 1, the lens structure of a camera is shown by reference numeral 10 comprising a taking lens 12 fastened in a lens mounting 14 which is biased downwardly by a spring 16. A latch 18 is shown in an indented portion 20 of the lens mounting 14 and is shown held in this position by a bias member 22 urging the latch member 18 to the left in FIG. 1. A release button 26 is shown in FIG. 1 normally biased to the left by a spring member 28 and having a first extension 30 and a second extension 34. Upon activation of the release button 26, extension 34 first operates to close the switch contacts of an auto focus power switch 32 thereby providing power to the system to be described. Further motion of release button 26 causes extension 30 to bear against the latch member 18 causing it to move to the right and out of the detent portion 20 and thereby releasing the lens mounting 14 and lens 12 to move downwardly.

When lens mounting 14 and lens 12 move downwardly, an abutment 36 of lens mounting 14 will come in contact with one of a plurality of shims identified by reference numerals 40, 42 and 44 depending upon the output of the auto focus system and will then strike a moveable member 46 which will itself move downwardly a small amount indicated by space 48 before coming to rest against a fixed member 50. As moveable member 46 moves downwardly, an extension shown by arrow 52 will operate a switch 54 which causes the shutter release mechanism, not shown, to operate. For purposes to be explained in greater detail hereinafter, shim members 40, 42 and 44 are of different widths and are positioned between the abutment 36 and the moveable member 46 in accordance with the actuation of a plurality of solenoids 60, 62 and 64 which are caused to operate by the output of the auto focus system. Solenoid 60 is shown connected by means of a member 66 to shim 40 which is the largest in width, solenoid 62 is shown connected by a member 68 to shim 42 which is of the middle thickness of the three shims and solenoid 64 is shown connected by a member 70 to shim 44 which is the smallest of the shims. As can be seen, if none of the solenoids 60, 62, or 64 is actuated, then lens mounting 14 will move all the way downwardly until abutment 36 moves member 46 into contact with fixed member 50. If solenoid 64 is actuated, the smallest shim 44 will be placed in between abutment 36 and moveable member 46 so that the lens mounting 14 will not move as far as it did with none of the solenoids actuated. In similar fashion, if solenoid 62 is actuated, the middle sized shim will be placed between abutment 36 and moveable member 46 and again the lens mounting 14 will not move downwardly as far as it did with solenoid 64 actuated. It can be seen that by energizing or not energizing one or more of the three solenoids, various combinations of shims may be placed between the abutment 36 and the moveable member 46 and various amounts of downward motion of lens mounting 14 and lens 12 may be provided. With the use of three solenoids and three shims, eight different positions of the lens mounting 14 and lens 12 may be obtained. After the shutter release switch 54 has operated and the picture has been taken, the film advance mechanism, not shown, will be used to move the lens mounting 14 and lens 12 back to its original position and latch member 18 will again be moved into the indent 20 so as to hold the lens mounting 14 in the position shown in readiness for the next picture to be taken.

Also shown in FIG. 1 is a light source 80 identified as LED MOD which, in the preferred embodiment, produces a modulated beam of infrared energy along the path shown by axis 82 through a lens 84. The modulated LED 80 may transmit energy in a relatively narrow band preferably in the infrared region at about 0.94 microns. A filter may also be placed along axis 82 to further assure a narrow band of frequency. Lens 84 may act to focus or collimate the infrared energy directed along axis 82 although accurate collimation is not imperative. The infrared energy travels along axis 82 until it strikes a subject whose picture is to be taken. The modulated infrared energy that is reflected back from the subject travels along a path shown by axis 86 at the left hand side of FIG. 1 and passes through a lens 88 and a distorting lens 90 to thereafter strike a detector array 92. A filter may also be employed along axis 86 to reduce the amount of ambient energy and restrict the frequency that strikes detector array 92 to the narrow band projected by the LED modulator 80. The distorting lens 90 may be a cylindrical lens mounted as a separate element or may be incorporated as part of lens 88. Other kinds of lenses which may be made to create a relatively narrow image on detector array 92 may also be employed and, for example, lens 88 may be made similar to the astigmatic lenses which are common in the art.

The reflected energy along axis 86 will produce on the detector array 92 a relatively thin narrow line image into and out of the plane of FIG. 1 and the position of this line will vary with the range to the subject. With the subject at a far distance, axis 86 will be substantially parallel with axis 82 and the lens image will strike detector 92 at the right end thereof labeled "∞" in FIG. 1. If the subject were very close at, for example, one meter, the line image would strike detector 92 at the left end thereof labelled "1M" in FIG. 1. Positions of the line image between one meter and infinity will fall on detector 92 at corresponding positions between the ends thereof. Detector array 92 is composed of a plurality of detectors split into two equal areas and arranged on the surface of the detector in a pattern which will enable determination of the position of the reflected energy striking the surface thereof. FIG. 2 shows one embodiment of the surface of detector array 92 in which detectors of various sizes are placed in three rows thereon. The detectors are preferably photo diodes which generate a signal when energy is imaged on this surface although other types of detectors such as photo conducting or even charge coupled devices could be employed. The detectors have been shown as rectangles and in practice this will be their preferred approximate shape although other shape detectors may also be employed. For convenience, adjacent detectors have been shown either dotted or blank for purposes of showing which detectors will operate to produce a digital "0" or a digital "1" by the circuitry to be described. The first row, identified by the letter "A", has a small detector 100 at the left hand side thereof and shown by a dotted area. The width of detector 100 is one eighth of the width of the array and the heighth of the detector 100 may be chosen for convenience. In FIG. 2, detector 100 is shown to be approximately square but the heighth may chosen so as to have a more rectangular shape. Adjacent detector 100 is a detector 102 which is twice the width of detector 100 and is shown blank in FIG. 2. A third detector, 104, is mounted next to the detector 102 and is of the same width as detector 102 but is shown as a dotted area. A fourth detector, 106, is shown adjacent detector 104 and is of the same width as detectors 102 and 104 but again is shown as a blank area. Finally, row "A" contains a fifth detector, 108, at the right hand side which is of the same width as detector 100 and is also shown as a dotted area. The second row, identified by the letter "B", has a first detector 110 at the left hand side that is four times the width of detector 100 and is shown to be blank in FIG. 2. Row "B" also contains a second detector 112 adjacent detector 110, at the right hand side of the array, which is of the same width as detector 110 and is shown as a dotted area. The third row, identified by the letter "C", has a first detector 114 on the left hand side which is of the same width as detectors 102, 104 and 106 and is shown as a dotted area. Row "C" contains a second detector 116 adjacent detector 114 which is of the same width as detectors 110 and 112 and is shown in blank area. Finally, row C contains a third detector 118 adjacent detector 116, at the right hand side of the array, which is of the same width as detectors 102, 104, 106 and 114 and is shown as a dotted area. Along the bottom portion of FIG. 2, eight divisions or zones, which detector 92 with its array thereon can detect, are shown and these are identified by the numbers 1 through 8. The distorted image of the modulated infrared energy is shown in FIG. 2 as an elongated spot or a thin line image 120 lying in zone 3 of the detector array and crossing detectors 106, 112 and 116. Although relatively thin, the width of image 120 is normally much larger than the boundary area between adjacent detectors. The direction of movement of spot 120, as the object moves, is right and left in FIG. 2 and is transverse to its direction of elongation. The spot has been shown elongated in order to impinge on all three rows of detectors simultaneously using reasonably large detectors. If very thin rows of detectors were used, the spot could be undistorted and still fall on all three rows simultaneously. As mentioned above, the position of the image 120 along the array is indicative of the range to the subject from which the energy is being reflected. For example, a subject located quite far from the system would cause the line image 120 to be in zone 1 crossing detectors 108, 112 and 118. As the subject moves closer to the camera, the angle which axis 86 assumes causes the line image 120 to move to the left in FIG. 1 to a greater and greater extent depending on the distance to the subject. As a result, the energy shown by the line image 120 in FIG. 2, will move from the right or infinity position through zones 1, 2, 3, 4, 5, 6, 7 until finally it arrives at zone 8 at which time the line image 120 would strike detectors 100, 110 and 114.

In FIG. 2, the dotted area detectors 100, 104 and 108 of row A are connected together to a line not shown in FIG. 2 identified in FIG. 1 as line 130 and the signal thereon is given the designation "a". The blank areas 102 and 106 of row A in FIG. 2 are connected together by a line 132 in FIG. 1 and the signal thereon is given the designation "a'". The dotted detector 112 of row B in FIG. 2 is connected to a line 134 of FIG. 1 and the signal thereon is given the designation "b". The blank detector 110 of row B in FIG. 2 is connected to a line 136 in FIG. 1 and the signal thereon is given the designation "b'". The two dotted detectors 114 and 118 of row C in FIG. 2 are connected together to a line 138 of FIG. 1 and the signal thereon is designated "c". Finally, the blank detector 116 of row C in FIG. 2 is connected to a line 140 of FIG. 1 and the signal thereon is designated "c'". Whenever the line image 120 in FIG. 2 strikes the surface of a detector, that detector will produce a signal which will be carried by one of the lines 130–140 to a signal processing circuit shown in FIG. 1 as the dashed box 150 and will produce either a digital "0" signal or a digital "1" signal depending on whether a dotted or blank detector received the image. It will be seen from FIG. 2 that if the line of energy 120 is in zone 1, then there will be an output from detectors 108, 112 and 118 and signals will be produced on lines 130, 134 and 138 which, with the convention chosen, will produce a "0", "0", "0" output from the circuit to be described hereinafter. With the line image 120 positioned as shown in FIG. 2, detectors 106, 112 and 116 will produce outputs and these signals will appear on lines 132, 134 and 140 respectively which, with the convention used, will produce a "1", "0", "1" output. It will be apparent that as the line image 120 moves to the left in FIG. 2, it will strike different detectors in different zones and that the combination of signals for each zone is unique.

The position of the line image 120 on the detector array in FIG. 2, is not only a function of the range to the subject but also of the detector lens focal length and the base distance between the two lenses 84 and 88 of FIG. 1. The displacement, d, of the line image 120 from the infinity position may be given by the equation $d = fB/R$ where f is the detector lens 88 focal length, B is the base distance between lenses 84 and 88 and R is the range to the subject. If it is assumed that f is equal to 20 millimeters, B is equal to 50 millimeters and R is equal to 1000 millimeters at the closest range, the distance d becomes one millimeter. With this combination of values, the total length of the detector array then is one millimeter from the infinity edge to the one meter edge. The width of each zone may be calculated from the expression $z = fB/R_1 - fB/R_2$ where z is the zone width, $R_1$ the near range chosen for the zone and $R_2$ the far range chosen for the zone. Normally the zones are chosen to be of equal width so that lens 12 in FIG. 1 will move substantially equal amounts in changing focus from one range zone to another. Thus, with an array one millimeter wide, each zone will be substantially one eighth millimeter and the width of each detector in FIG. 2 is one eighth millimeter or slightly less due to the width of the border area between adjacent detectors. Manufacture of detectors with such small dimensions is not a difficult problem with today's solid state manufacturing techniques. Of course other values may be used for desired near range, the base distance and the focal length and the length of the array increased but those chosen above are fairly representative for use on a standard hand held camera. FIG. 2 may be composed of different numbers of rows and different numbers of detectors per row in order to vary the number of zones in accordance with the accuracy desired. For example, if four zone accuracy was all that was necessary, then, as shown in FIG. 4 two rows of detectors could be employed and the first row could contain a dotted small detector followed by a blank detector of twice the width as the small detector and followed by a dotted detector of the same width as the small detector while the second row could contain a pair of detectors each twice as wide as the small detector, one of which was dotted and one of which was blank. The arrangement of detectors in FIG. 2 is established in the preferred embodiment so that as line image 120 moves from one zone to another, the output of only one detector at a time changes. This produces an output of a type referred to as "gray code". Obviously, the three rows A, B and C may be placed in different order and other arrangements of detectors could be established and still produce a gray coded arrangement. For example as is shown from right to left in FIG. 5, row A might have a small dotted detector, a blank detector adjacent the small detector but four times as wide and a dotted detector adjacent the blank detector and three times as wide as the small detector while row B might have four detectors alternating dotted and blank with each being twice as wide as the small detector while row C might have a dotted detector three times as wide as the small detector followed by a blank detector four times as wide as the small detector and followed by a dotted detector the same width as the small detector. Other arrangements will occur to those skilled in the art. Of course, the detectors might also be arranged to produce a binary output but with a binary code, more than one output can change at the same time. The gray code of FIG. 2 has the advantage of preventing a significant error if the width of the line 120 were sufficient to expose two different detectors in the same row. Thus, for example, if the line 120 were moved slightly to the left in FIG. 2 and covered both detectors 104 and 106, then with the convention used herein, either a "1", "0", "1" or a "0", "0", "1" output might result from the circuitry to be described. Accordingly, the system would respond so as to focus the camera either in zone 3 or in zone 4. In either case, it would be quite close to the desired focus position. On the other hand, if more than one detector changed for each of the zones, then the overlapping of two detectors in two or more rows could result and the system might focus with a significant error.

For example, in going from a binary 5 to a binary 6, the outputs would change from "1", "0", "1" to "1", "1", "0" in which case an overlapping of the line image might produce a "1", "0", "1", a "1", "1", "0", a "1", "1", "1" or a "1", "0", "0", the latter two of which represent a binary 7 and binary 4 respectively and the system would not focus in either the zone represented by the binary 5 or the binary 6. In some applications, this might be acceptable but in the present invention, the gray coded array is preferred. Accordingly, in designing the detector array, it is best to avoid having two junctures or boundary areas between detectors in different rows positioned so that the line image can fall on both of them and, of course, each of the zones must be unique having a different arrangement of dotted and blank detectors therein.

Utilizing the equation d=fB/R and the chosen variables for focal length, base, range, and assuming zones of equal width, the distances for subject range in each of the zones may be calculated. FIG. 3 shows a chart in which the eight zones are identified at the top of the columns and directly below each zone is the distance in meters to the subjects located in the far portion of that zone and the near portion of that zone. For example, in zone 1, the subject may be from infinity to 8 meters, in zone 2, the subject may be between 8 meters and 4 meters, in zone 3, the subject may be between 4 meters and 2.66 meters, in zone 4, the subject may be between 2.66 meters and 2.0 meters, in zone 5, the subject may be between 2.0 meters and 1.6 meters, in zone 6, the subject may be between 1.6 meters and 1.33 meters, in zone 7, the subject may be between 1.33 meters and 1.14 meters and in zone 8, the subject may be between 1.14 and 1.0 meters. In FIG. 3, the outputs of the detectors in rows A, B and C are shown for each of the zones and, as will be further described below, it has been assumed that the dotted area detectors of FIG. 2 produce a "0" signal at the output of the signal processing circuit 150 while the blank detectors produce a "" signal when the line image 120 strikes therein. As can be seen in FIG. 3, the outputs of the three rows when the energy line is in the first zone will be A=0, B=0 and C=0. When the line image 120 is in zone 2 the output will be A=1, B=0 and C=0. In zone 3 the outputs will be A=1, B=0 and C=1. In zone 4 the outputs will be A=0, B=0 and C=1. In zone 5 the outputs will be A=0, B=1 and c=1. In zone 6 the outputs will A=1, B=1 and C=1. In zone 7 the outputs will be A=1, B=1 and C=0. In zone 8 the outputs will be A=0, B=1 and C=0. The outputs A, B and C are shown in FIG. 1 as output lines 160, 162 and 164 emerging from the signal processing circuit 150 and entering a converter circuit 166. The purpose of converter circuit 166 is to change the gray coded signals A, B and C to binary coded signals S, M and L so as to more easily operate the solenoids 60, 62 and 64, as will be further explained hereinafter. The converted signals S, M and L produced by from converter 166 are shown on output lines 170, 172 and 174 of FIG. 1 connected to the solenoids 64, 62 and 60 respectively. The "S" signal on line 170 controls the solenoid 64 operating the small shim 44, the "M" signal on line 172 controls the solenoid 62 operating the medium sized shim 42 and the "L" signal on line 174 controls the solenoid 60 operating the large shim 40.

The converted signals S, M and L are shown in FIG. 3 just below the output signals A, B and C and it seen that in zone 1, the converted signals are S=0, L=0 and M=0. In zone 2, S=1, L=0 and M=0. In zone 3, S=0, L=0 and M=1. In zone 4, S=1, L=0 and M=1. In zone 5, S=0, L=1 and M=0. In zone 6, S=1, LL=1 and M=0. In zone 7, S=0, L=1 and M=1. In zone 8, S=1, L=1 and M=1. As can be seen, the outputs S, L and M are in binary form and, as such, are most advantageous in performing the operations of properly energizing solenoids 60, 62 and 64 of FIG. 1.

For each zone detected, the lens 12 will be positioned at a predetermined location with respect to the infinity position. The positioning of a 25 millimeter focal length lens for each of the zones is shown in the fourth row in FIG. 3 and it is seen that in zone 1 the lens extension is 0.04 millimeters from the infinity position. This will produce an exactly focussed subject at 15.6 meters as is indicated in the last row of FIG. 3. In zone 2, the lens extension will be 0.12 millimeters from the infinity position and this will produce an exactly focussed subject located at 5.23 meters. In zone 3, the lens extension will be 0.20 millimeters which will produce the exact focus for subjects located at 3.14 meters. In zone 4, the lens extension will be 0.28 millimeters which will produce an exactly focussed subject at 2.25 meters. In zone 5, the lens extension will be 0.36 millimeters which will produce an exactly focussed subject at 1.76 meters. In zone 6 the lens extension will be 0.44 millimeters which will produce an exactly focussed subject at 1.44 meters. In zone 7 the lens extension will be 0.52 millimeters which will produce an exactly focussed subject at 1.23 meters. In zone 8, the lens extension will be 0.60 millimeters which will produce an exactly focussed subject at 1.06 meters. It is seen that for the values chosen, the lens moves 0.08 millimeters for each zone change. Of course, with the depth of field of the taking lens, satisfactory focus will be obtained for subjects located throughout the zone and usually beyond. It is thus seen that utilizing the eight zones created by the arrangement of detectors in FIG. 2, subjects located in any of the eight zones between one meter and infinity can be satisfactorily focussed by use of the present invention.

Referring again to FIG. 1, as mentioned in connection with the explanation of the detector array of FIG. 2, the signals from the various rows of detectors and identified as a, a', b, b', c and c' are presented on lines 130–140 to the signal processing circuit 150. More specifically, the a signal appearing on line 130 is presented through a junction point 200 to an inverting amplifier 202 which has an output on a line 204. If energy is being received by either detector 100, 104 or 108 of FIG. 2, then an "a" signal will appear on line 130 and by virtue of the inverting properties of amplifier 202, the phase of this signal will be reversed 180 degrees so that the signal appearing on line 204 will be 180 degrees out of phase with the signal being emitted from the LED modulator 80. If no energy is being received by either detector 100, 104 or 108 of FIG. 2, then there will be no signal on line 130 and no output from amplifier 202 on line 204. In similar fashion, if either detectors 102 or 106 are receiving energy in FIG. 2, then an "a'" will appear on line 132 which signal is presented to a noninverting amplifier 206 having an output on line 208. The output on line 208 will be a signal in phase with the signal being emitted from LED modulator 80. On the other hand, if no energy is being received by either detector 102 or 106 in FIG. 2, then there will be no signal on line 132 and there will be no in phase output signal on line 208. If energy is being received by detector 112 in FIG. 2, then a "b" signal will appear on line 134 which is presented through a junction point 210 to an inverting amplifier 212 having an output on line 214. Thus, if energy is being received by detector 112, then a "b" signal will appear on line 134 and by virtue of the inverter 212, a 180 degrees out-of-phase signal will appear on line 214. On the other hand, if no energy is being received by detector 112, then there will be no signal on lines 134 or 214. If detector 110 is receiving energy in FIG. 2, then a "b'" signal will appear on line 136 which signal is presented to a noninverting amplifier 216 having an output on line 218. If detector 110 of FIG. 2 is receiving energy, then an in-phase signal will appear on line 136 and a similar in-phase signal will appear on line 218. On the other hand, if detector 110 is not receiving energy, then no signal will appear on line 136 or on line 218. Similarly, if either detectors 114 and 118 of FIG. 2 are receiving energy, then a "c" signal will appear on line 138 which signal is presented through a junction point 220 to an inverting amplifier 222 having an output on line 224. Thus, if energy is being received by either detectors 114 or 118 of FIG. 2, an in-phase signal will appear on line 138 and a 180 degree out-of-phase signal will appear on line 224. On the other hand, if no energy is being received by either detectors 114 or 118, then there will be no signal on line 138 and on line 224. Finally, if energy is being received by detector 116 of FIG. 2, a "c'" signal will appear on line 140 of FIG. 1 which signal is presented to a noninverting amplifier 226 having an output on line 228. If a signal appears on line 140 indicative of the fact that energy is falling on detector 116 of FIG. 2, an in-phase signal will appear on line 228. On the other hand, if no signal is being received by detector 116 of FIG. 2, then no signal will appear on line 140 and on line 228 of FIG. 1.

The signals appearing on lines 204 and 208 of FIG. 1 are presented through resistors 230 and 232 to a junction point 234 connected to an amplifier 236 having an output on a line 238. Resistors 230 and 232 act to sum the signals that may appear on lines 204 and 208. Normally, the line image 120 of FIG. 2 will only fall on a single detector in each row, but it may happen that the width of the line image 120 will cause energy to be received on two adjacent detectors when the line image is close to the boarder between two adjacent detectors. In the event "a" and "a'" signals may appear simultaneously on lines 130 and 132, an out-of-phase signal on line 204 will occur at the same time an in-phase signal appears on line 208. However, in all but the rarest of cases, more energy will fall on one detector than the other so that the magnitude of the signal on line 204 will be larger than that on line 208 or vice versa. Depending upon which of the signals is largest, an in-phase or 180 degree out-of-phase signal will appear at junction point 234 and on the output line 238 of amplifier 236. In similar fashion, the output signals on lines 214 and 218 of FIG. 1 are presented through resistors 240 and 242 to a junction point 244 which is connected to an amplifier 246 having an output on line 248. As with the previously described summing circuit, under normal conditions there will not simultaneously be a signal on both lines 214 and 218 but when the line image is proximate the junction between detectors 110 and 112 in FIG. 2, energy may fall on both detectors thus producing "b" and "b'" signals at the same time on lines 134 and 136 in FIG. 1. Because one of these signals will almost always be at least slightly larger than the other, the summing resistors 240 and 242 will cause the predominate signal, either in-phase or out-of-phase, to appear at junction point 244 and on the output line 248 of amplifier 246. Finally, the signals appearing on lines 224 and 228 of FIG. 1 are presented through resistors 250 and 252 to a junction point 254 which is connected to the input of an amplifier 256 having an output on a line 258. In a manner similar to that explained above, there will normally be only one signal either on line 224 or on line 228 but when the image line 120 of FIG. 2 is near a junction point, there may simultaneously be "c" and "c'" signals on lines 138 and 140 of FIG. 1. In either case, any in-phase signal appearing on line 228 will be compared with any 180 degree out-of-phase signal appearing on line 224 so that the resultant signal appearing at junction point 254 and on line 258 will be either in-phase or out-of-phase indicative of which of the detectors is receiving all or more of the energy in row C of FIG. 2. Obviously, the gain of the noninverting amplifiers 206, 216 and 226, should be the same as the gain of the inverters 202, 212 and 222 and if the gain of the inverters 202, 212 and 222 is one, then the noninverting amplifiers 206, 216 and 226 may be eliminated.

The signals appearing on lines 238, 248 and 258 in FIG. 1, indicative of the detectors which are energized in each of the rows A, B and C of FIG. 2 are presented to phase detectors 260, 262 and 264 respectively. The phase detectors also receive in-phase signals from an oscillator 268 via lines 270, 272 and 274. Phase detectors 260, 262 and 264 compare the phase appearing on lines 238, 248 and 258 respectively with the in-phase signal from oscillator 268 so as to produce output signals on lines 280, 282 and 284 respectively indicative of this phase comparison. The phase detectors operate to produce a digital "1" signal whenever the inputs thereto are of the same phase, and operate to produce a digital "0" whenever the inputs thereto are of the opposite phase. More specifically, if an in-phase signal appears on line 238 indicative of the fact that a signal "a'" on line 132 is of predominant magnitude, phase detector 260 will have two in-phase inputs on lines 238 and 274 and the output on line 280 will be a "1" whereas if the signal on line 238 is 180 degrees out of phase from the signal on line 274 from oscillator 268 indicative of the fact that an "a" signal on line 130 is of predominant magnitude, the output on line 280 will be a "0". In similar fashion, if the signal on line 248 is in-phase with the signal on line 272 from oscillator 268 indicative of the fact that a "b'" signal on line 136 is of predominant magnitude, then a "1" output will appear on line 282 but if the signal on line 248 is 180 degrees out-of-phase with the signal on line 272 from oscillator 268 indicative of the fact that a "b" signal on line 134 is of predominant magnitude, then a "0" signal will appear on line 282. Finally, if the signal on line 258 is in-phase with the signal on line 270 from oscillator 268 indicative of the fact that a "c'" signal on line 140 is of predominant magnitude, then a "1" signal will appear on line 284 but if the signal on line 258 is 180 degrees out-of-phase with the signal on line 270 from oscillator 268, indicative of the fact that a "c" signal on line 138 is of predominant magnitude, then a "0" signal will appear on line 284. The signals on lines 280, 282 and 284 are identified as the outputs A, B and C from the signal processing circuit 150 in FIG. 1 and these signals will be either "1" or "0" signals depending on the position of line image 120 in FIG. 2. Capacitors 290, 292 and 294 are connected between the outputs of phase detectors 260, 262 and 264 and signal ground respectively so as to smooth the A, B and C signals and reduce noise and also any ripple that is usually inherent in phase detectors.

Oscillator 268 has an output on a line 296 that is presented through capacitors 298, 300 and 302 respectively to lines 130, 134 and 138. The purpose of these connections is to produce a slight in-phase signal on lines 130, 134 and 138 respectively so that in the absence of any signal at all from the detectors of FIG. 2, as would occur when the range to the remote object was quite large, there will be out-of-phase signals on lines 204, 214 and 224 and thus on lines 238, 248 and 258 so that the output signals A, B and C will be all "0's" and the apparatus will operate to focus at infinity or the hyperfocal distance as will be further explained hereinafter. It should also be noticed that since the bias provided by capacitors 298, 300 and 302 is slightly larger than any noise expected to be encountered but smaller than the signals from the detectors, the dotted detectors of FIG. 2 could be eliminated entirely if desired, since when the line image 120 falls upon an empty space rather than a dotted detector, the bias produced by capacitors 298, 300 and 302 provides a signal to inverters 202, 212 and 222 with the same result as if the line image had impinged upon a dotted detector. In practice, however, since the production of the detectors is quite easy, it is preferred to have both the blank and the dotted detectors in the array because it is better to have a well defined signal than the small bias signal when the energy impinges on a dotted detector. If the bias were increased to give a larger signal, then with the remote objects, the energy impinging on a detector might decrease below the bias level and signals from the blank detectors would be overpowered by the bias signal resulting in a false indication.

Oscillator 268 has a final output on a line 304 which is presented to the LED modulator 80 for purposes of modulating the IR beam eminating from lens 84 and establishing the in-phase signal.

The "A" signal from signal processing circuit 150 appearing on line 160 is presented to converter circuit 166 by a line 310 connected to one input of an exclusive OR gate 312 which has an output on a line 314 identified as the "S" output. The "B" output from signal processing circuit 150 appearing on line 162 is presented to converter circuit 166 through a junction point 320 to a line 322 which is identified as the "L" output. The "C" output from signal processing circuit 150 appearing on line 164 is presented to converter circuit 166 by a line 326 to one input of an exclusive OR gate 328 having an output on line 330. The output on line 330 is presented through a junction point 334 to a line 336 identified as the "M" output. Junction point 320 is connected by a line 340 to the other input of exclusive OR gate 328 and junction point 334 is connected by a line 334 to the other input of exclusive OR gate 312. The outputs S, L and M on lines 314, 322 and 336 are connected to conductors 170, 174 and 172 leading to solenoids 64, 60 and 62 respectively. The signals S, L and M cause the positioning of small shim 44, large shim 44 and medium shim 42 respectively between abutment 36 and moveable member 46 for purposes of properly positioning lens 12. The outputs S, L and M are also connected by lines 350, 352 and 354 respectively to a zone decoder box 356 which may be of the binary to octal decoder type shown in FIGS. 4-12 of Section 4-8 on page 109 of "Computer Logic Design" by M. Morris Mano published by Prentice-Hall, Inc., Englewood Cliffs, New Jersey. Such a device receives three binary coded signals and operates to provide eight output signals which are shown in FIG. 1 connected to eight indicating devices identified by reference numerals 360-367. Zone decoder 356 will analyze the signals on lines 350, 352 and 354 indicative of the S, L and M signals and will produce indications on indicators 360 through 367 indicative of which of the zones 1 through 8 of FIG. 2 the line image 120 impinges upon. This will provide a visual indication to the photographer of what zone the camera is focussing on.

If the signals A, B and C are all 0, then the exclusive OR gates 312 and 328 of converter 166 will operate to produce "0" signals on all three lines 314, 322 and 336 and thus none of the solenoids 60, 62 and 64 will be activated. This occurs when the energy line 120 of FIG. 2 is in the infinity position or zone 1 of FIG. 2. As a result, when the latch member 118 releases the lens mounting 14, abutment 36 will move down until it contacts moveable member 46 and both lens mounting 14 and moveable member 46 will move a distance equal to the spacing 48 before coming to rest. The length of member 46 is chosen to provide the lens extension necessary for the zone 1 which is 0.04 millimeters and is the hyperfocal position. Thus when the lens 12 comes to rest and shutter release switch 54 is actuated, the lens will be in the proper position for subjects located between 8 meters and infinity from the camera. Of course, member 46 could be firmly mounted against the fixed member 50 but then alternate arrangements would have to be used to actuate switch 54.

In zone 2 when the output A is a "1", the output B is a "0" and the output C is a "1", the exclusive OR gates 312 and 328 will operate so that the output S is a "1", the output L is a "0" and the output M is a "0". Under these circumstances, a signal will appear on line 170 but not on lines 172 and 174 and solenoid 64 alone will be actuated so as to insert shim 44 between abutment 36 and moveable member 46. Shim 44 is chosen to have a width of 0.08 millimeters and accordingly, when latch member 18 releases lens mounting 14, abutment 36 will move until it contacts shim 44 and together they will move until they contact moveable member 46 and an additional amount of movement will be allowed due to the spacing 48. As a result, the lens mounting will come to rest at a position which is the sum of 0.04 millimeters representing the hyperfocal position and the 0.08 millimeter width of shim 44. The lens housing will therefore stop in a position which is 0.12 millimeters from the infinity position which, as seen in FIG. 3, is the zone 2 lens extension position and subjects between 8 meters and 4 meters from the camera will be properly focussed. In zone 3, the outputs A, B and C are 1, 0 and 1 respectively and the exclusive OR circuits 312 and 328 operate to produce the signals S=0, L=0 and M=1. As a result, solenoid 62 will be actuated and shim 42 will be moved in between abutment 36 and moveable member 46. Shim 42 is chosen to have a width of 0.16 millimeters and accordingly, when latch member 18 releases lens mounting 14, abutment 36 will move down until it contacts shim 42 and they together will move until they contact moveable member 46 and all three will move the distance provided by space 48 at which time the shutter release mechanism 54 is actuated. In this position, the lens mounting is located the sum of 0.04 millimeters+0.16 millimeters=0.2 millimeters which is the proper setting for zone 3 and subjects between 4 meters and 2.66 meters will be properly focussed. In zone 4, the outputs A, B and C are "0", "0" and "1" respectively and the exclusive OR gates 312 and 338 operate to produce the signals S=1, L=0 and M=1 for zone 4. As a result, solenoid 64 and 62 will be actuated and the small and medium shims 44 and 42 respectively will both be inserted between the abutment 36 and the moveable member 46. As a result, when the lens mounting comes to rest, its position will be the sum of 0.04 millimeters, shim 44's width and shim 42's width which totals 0.28 millimeters and is the correct position for zone 4 so that subjects between 2.66 meters and 2 meters will be properly focussed. In zone 5, the A, B and C outputs are "0", "1" and "1" and the converted outputs S, L and M become "0", "1" and "0" respectively. Under these circumstances, solenoid 60 is actuated and large shim 40 is inserted between abutment 36 and moveable member 46. Shim 40 has a width of 0.32 millimeters and as a result, the lens mounting 14 will come to a rest position representing the sum of the width of shim 40 and 0.04 millimeters, the total of which is 0.36 millimeters. This is the correct position for zone 5 and subjects between 2 meters and 1.6 meters will be properly focussed. In zone 6, the A, B and C signals each become "1's" and the converted signals S, L and M become "1", "1" and "0" respectively. Under these circumstances solenoids 60 and 64 will be actuated inserting shims 40 and 44 between abutment 36 and moveable member 46. The lens mounting 14 will therefore come to a rest position which is 0.44 millimeters from the infinity position and subjects between 1.6 meters and 1.33 meters will be in focus. In zone 7, the outputs A, B and C are "1", "1" and "0" respectively and the outputs of the conversion circuit 166 become S=0, L=1 and M=1. Under these circumstances, solenoids 60 and 62 will be actuated and shims 40 and 42 will be inserted between abutment 36 and moveable member 46. The lens mounting will therefore come to a rest position at 0.52 millimeters from the infinity position and subjects between 1.33 meters and 1.14 meters will be in focus. Finally, in zone 8 the outputs A, B and C are 0, 1, 0 respectively and the converted outputs S, L and M become 1, 1 and 1 respectively. Under these circumstances, all of the solenoids 60, 62 and 64 will be actuated and all of the shims 40, 42 and 44 will be inserted between abutment 36 and moveable member 46. Thus, when the lens mounting 14 comes to rest, it will be in a position representative of the sums of the thicknesses of the shims plus 0.04 millimeters. This sum is 0.60 millimeters, the correct distance for the lens extension in zone 8 and subjects between 1.14 meters and 1 meter will be properly focussed.

It is thus seen that I have provided an active auto focus system employing a novel detector which can determine in which of 8 zones a light image is present with each of the zones representing a different range from the camera to the subject. It is seen that my system is not complex and may be easily and inexpensively produced. It is also seen that I have provided a novel, accurate and inexpensive arrangement for moving the lens to the correct focus position without the use of electrical motors. Many obvious alterations will occur to those skilled in the art and I do not wish to be limited by the specific disclosures used in connection with the preferred embodiment. I intend only to be limited by the following claims.

The embodiments of the invention in which an exclusive property or right is claimed are defined as follows:

1. Apparatus for positioning the taking lens means of a camera comprising:
    housing means carrying the lens means and movable along a first path;
    a first member positioned a predetermined space from the housing means in the first path, the housing means moving in the first path, contacting the first member and being restrained from further movement in a first position after the housing means has contacted the first member; and
    spacing means operable to move into and out of the predetermined space and operable when in the predetermined space to cause the housing means in its movement in the path to contact the spacing means, said housing means and said spacing means thereafter moving together in the first path, contacting the first member and being restrained from further movement with the housing means in a position other than the first position after the housing means together with the spacing means has contacted the first member.

2. Apparatus according to claim 1 wherein the spacing means comprises a first shim having a first width and a second shim having a second width, each shim being independently operable to move into the predetermined space and wherein with no shim in the predetermined space the first position is such that the lens means provides a satisfactory focus at the image plane thereof for objects located in a first zone of ranges from the camera, with the first shim in the predetermined space, the housing means is restrained at a second position such that the lens means produces a satisfactory focus at the image plane thereof for objects located in a second zone of ranges from the camera, with the second shim in the predetermined space, the housing means is restrained at a third position such that the lens means produces a satisfactory focus at the image plane thereof for objects located in a third zone of ranges from the camera, and with the first and second shims in the predetermined space, the housing means is restrained at a fourth position such that the lens means produces a satisfactory focus at the image plane thereof for objects located in a fourth zone of ranges from the camera.

3. Apparatus according to claim 1 further including a third shim having a third width and movable into the predetermined zone independently of the first and second shims is included and the housing means is restrained in fifth, sixth, seventh or eighth positions by the moving of the third shim alone or in combination with the first and second shims into the predetermined space.

* * * * *